(12) United States Patent
Satozono et al.

(10) Patent No.: US 9,789,872 B2
(45) Date of Patent: Oct. 17, 2017

(54) WORK VEHICLE

(71) Applicants: Kubota Corporation, Osaka-shi (JP); Fuji Jukogyo Kabushiki Kaisha, Tokyo (JP)

(72) Inventors: Takeshi Satozono, Sakai (JP); Noriyasu Honjo, Sakai (JP); Jun Yoshida, Sakai (JP); Hiroki Bessho, Sakai (JP); Kensuke Okabe, Sakai (JP); Makoto Kuwatoh, Tokyo (JP); Tatsuya Tsuji, Tokyo (JP)

(73) Assignees: Kubota Corporation, Osaka (JP); Subaru Corporation, Tokyo (JP)

( * ) Notice: Subject to any disclaimer, the term of this patent is extended or adjusted under 35 U.S.C. 154(b) by 0 days.

(21) Appl. No.: 15/164,979

(22) Filed: May 26, 2016

(65) Prior Publication Data

US 2017/0036544 A1 Feb. 9, 2017

(30) Foreign Application Priority Data

Aug. 3, 2015 (JP) .................................. 2015-153528

(51) Int. Cl.
*B60W 30/18* (2012.01)
*B60K 31/00* (2006.01)

(52) U.S. Cl.
CPC .................. *B60W 30/18036* (2013.01); *B60K 2031/0091* (2013.01); *B60W 2300/40* (2013.01); *B60W 2510/0657* (2013.01); *B60W 2540/16* (2013.01)

(58) Field of Classification Search
CPC .......... B60K 31/02; B60K 2031/0091; B60W 30/18036; B60W 2510/0657; B60W 2540/16; B60W 2300/40
See application file for complete search history.

(56) References Cited

U.S. PATENT DOCUMENTS

| 5,690,576 | A * | 11/1997 | Moroto | F16H 37/0846 475/211 |
| 6,086,510 | A * | 7/2000 | Kadota | F02D 11/105 477/107 |
| 6,371,885 | B1 * | 4/2002 | Kobayashi | B60W 10/02 477/115 |
| 8,262,540 | B2 * | 9/2012 | Higaki | B60W 10/06 477/109 |
| 8,337,353 | B2 * | 12/2012 | Iwaki | F16H 47/04 475/302 |
| 8,608,605 | B2 * | 12/2013 | Hiraoka | B60W 30/18036 475/6 |

(Continued)

FOREIGN PATENT DOCUMENTS

JP 2014119108 A 6/2014

*Primary Examiner* — Paul N Dickson
*Assistant Examiner* — Timothy Wilhelm
(74) *Attorney, Agent, or Firm* — The Webb Law Firm

(57) ABSTRACT

A work vehicle includes a travelling state determination unit capable of determining a travelling state of a travelling body, and a control unit that restricts, if it has been determined by the travelling state determination unit that the travelling body is in a reverse travelling state, an upper limit value of a target rotational speed of an engine that is based on an operation on an accelerator operation tool to be a lower value than in a case where it has been determined by the travelling state determination unit that the travelling body is in a forward travelling state.

6 Claims, 8 Drawing Sheets

(56) References Cited

U.S. PATENT DOCUMENTS

| | | | | |
|---|---|---|---|---|
| 8,880,303 | B2* | 11/2014 | Ishikawa | F16H 61/16 |
| | | | | 477/15 |
| 9,193,345 | B2* | 11/2015 | Ishikawa | B60W 10/06 |
| 9,279,488 | B2* | 3/2016 | Ishino | F16H 37/022 |
| 9,475,484 | B2* | 10/2016 | Fushiki | B60K 6/46 |
| 2012/0245808 | A1* | 9/2012 | Shiraki | F02D 41/021 |
| | | | | 701/51 |
| 2012/0322617 | A1* | 12/2012 | Takahashi | B60W 30/18036 |
| | | | | 477/96 |
| 2016/0082966 | A1* | 3/2016 | Kaneko | B60W 30/188 |
| | | | | 701/84 |

* cited by examiner

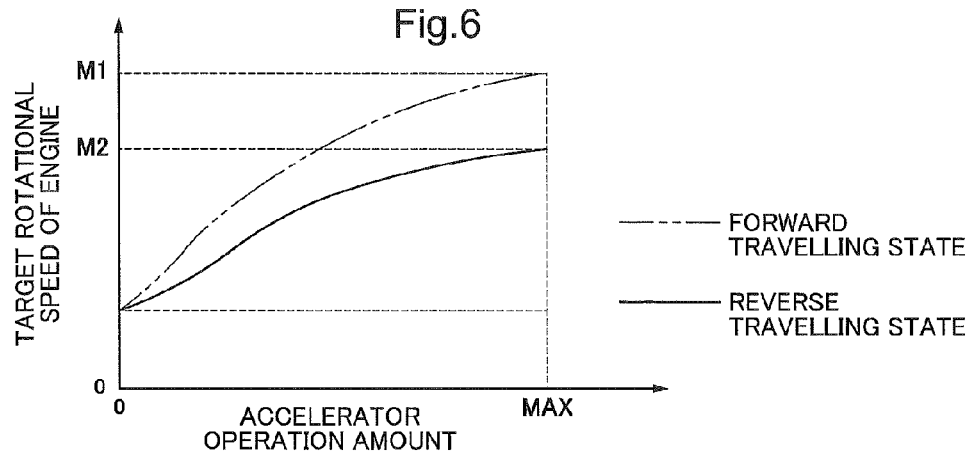
Fig.6
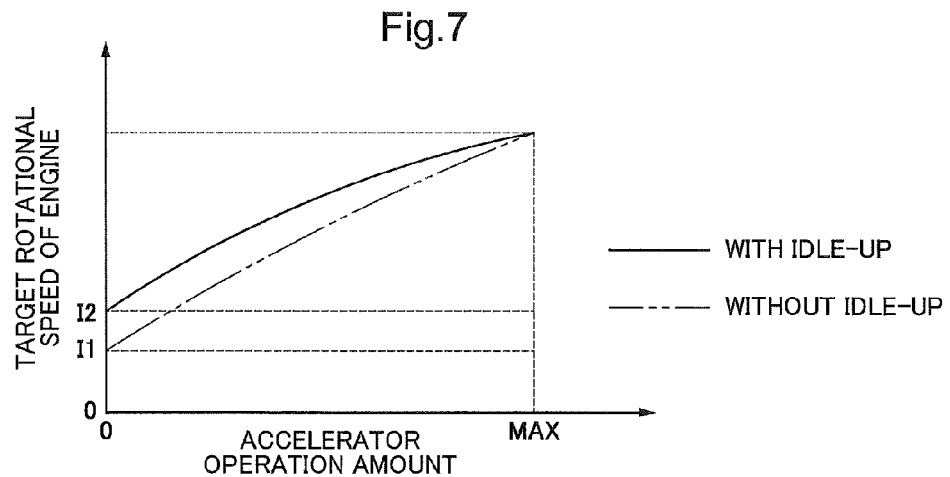
Fig.7
Fig.8
|  | REVERSE TRAVELLING STATE | NEUTRAL STATE | FIRST SPEED FORWARD TRAVELLING STATE | SECOND SPEED FORWARD TRAVELLING STATE |
|---|---|---|---|---|
| HIGHEST ROTATIONAL SPEED OF ENGINE | 4e | 6e | 6e | 6e |
| REDUCTION RATIO | 2r | - | 4r | 3r |
| HIGHEST DRIVING TORQUE | 2t | - | 4t | 3t |
| HIGHEST TRAVELLING SPEED | 2r | - | 1.5r | 2r |

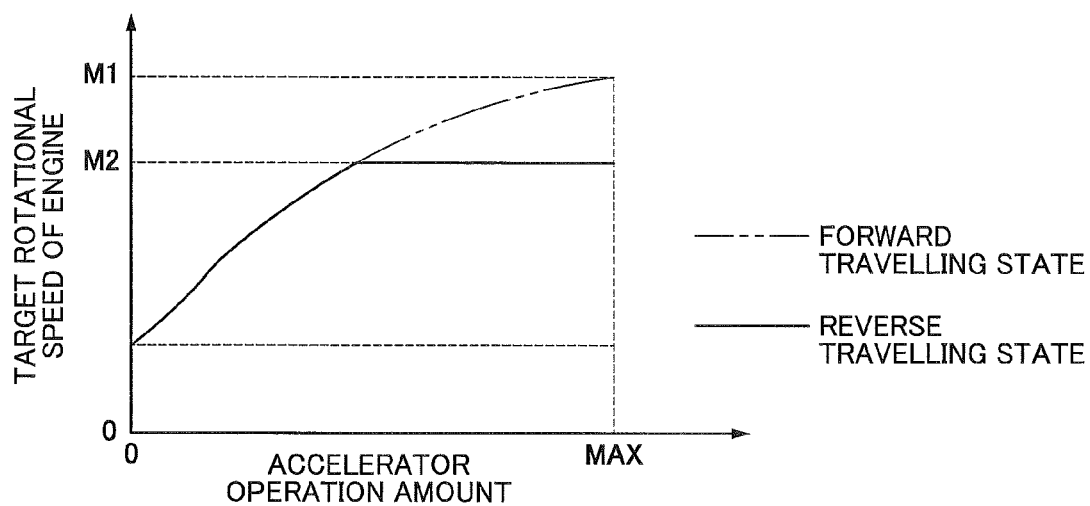

WORK VEHICLE

CROSS-REFERENCE TO RELATED APPLICATION

This application claims priority to Japanese Patent Application No. 2015-153528 filed Aug. 3, 2015, the disclosure of which is hereby incorporated in its entirety by reference.

BACKGROUND OF THE INVENTION

Field of the Invention

The present invention relates to a work vehicle.
Description of the Related Art
A conventional work vehicle is described in JP 2014-119108A, for example. The conventional work vehicle described in this publication is provided with a travelling body capable of travelling using travelling apparatuses ("front wheels" and "rear wheels" in this publication), and an accelerator operation tool ("gear shift pedal" in this publication) capable of changing a target rotational speed of an engine through an operation.

However, with the above conventional technique, even if the travelling body is in a reverse travelling state, the upper limit value of the target rotational speed of the engine that can be changed based on an operation on the accelerator operation tool is similar to that in the case where the travelling body is in a forward travelling state. For this reason, if the accelerator operation tool is greatly operated due to an erroneous operation or the like when the travelling body is in the reverse travelling state, the target rotational speed of the engine will excessively increase, and there is a disadvantage that the driving torque of the travelling apparatuses, which are driven based on the power of the engine, will become excessively large. If there is such a risk that the driving torque of the travelling apparatuses will thus become excessively large when the travelling body is in the reverse travelling state, for example, inconvenience such as the travelling apparatuses riding up a wheel stopper when parking while causing the travelling body to travel in reverse tends to occur.

In view of the foregoing situation, provision of a work vehicle capable of suppressing the driving torque of the travelling apparatuses becoming excessively large in the case where the travelling body is in the reverse travelling state has been desired.

SUMMARY OF THE INVENTION

A work vehicle according to the present invention comprising:
an engine;
a transmission capable of converting power of the engine into forward travelling power or reverse travelling power and outputting the converted power;
a travelling apparatus capable of being driven by the power output from the transmission;
a travelling body capable of travelling using the travelling apparatus;
an accelerator operation tool capable of changing a target rotational speed of the engine through an operation;
a travelling state determination unit capable of determining a travelling state of the travelling body; and
a control unit that, if it has been determined by the travelling state determination unit that the travelling body is in a reverse travelling state, restricts an upper limit value of the target rotational speed of the engine that is based on an operation on the accelerator operation tool to be a lower value than in a case where it has been determined by the travelling state determination unit that the travelling body is in a forward travelling state.

According to the present invention, if the travelling body is in the reverse travelling state, the upper limit value of the target rotational speed of the engine that is based on the operation on the accelerator operation tool is restricted to a lower value than in the case where the travelling body is in the forward travelling state. Therefore, even if the accelerator operation tool is greatly operated due to an erroneous operation or the like in the case where the travelling body is in the reverse travelling state, the target rotational speed of the engine does not excessively increase. As a result, the driving torque of the travelling apparatus that is driven by the reverse travelling power obtained by converting the power of the engine using the transmission does not increase beyond a certain level. Thus, for example, the occurrence of inconvenience such as the travelling apparatus riding up a wheel stopper when parking the travelling body while causing the travelling body to travel in reverse can be avoided.

Thus, according to the present invention, the driving torque of the travelling apparatus in the case where the travelling body is in the reverse travelling state becoming excessively large can be favorably suppressed.

In the present invention, it is favorable to further include the following configuration, that is, the above work vehicle further comprising:
a gear shift operation tool capable of achieving, by being operated to a forward travelling position, a state where the transmission can output the forward travelling power, and achieving, by being operated to a reverse travelling position, a state where the transmission can output the reverse travelling power,
wherein the travelling state determination unit is configured to determine that the travelling body is in the reverse travelling state, by the gear shift operation tool being in the reverse travelling position.

With this configuration, as a result of the operation position of the gear shift operation tool for performing an operation on the transmission being in the reverse travelling position, it is determined that the travelling body is in the reverse travelling state. It is thus possible to restrict the upper limit value of the target rotational speed of the engine that is based on the operation on the accelerator operation tool before the travelling body actually starts to travel in reverse, and an excessive increase in the driving torque of the travelling apparatus in the case where the travelling body is in the reverse travelling state can be favorably inhibited.

In the present invention, it is favorable to further include the following configuration, that is, the above work vehicle further comprising:
a map storing unit that stores multiple sets of map data indicating a relationship between an operation amount of the accelerator operation tool and the target rotational speed of the engine,
wherein the control unit is configured to control a rotational speed of the engine based on the map data that is selectively read out from the map storing unit, and
wherein if it has been determined by the travelling state determination unit that the travelling body is in the reverse travelling state, the control unit is configured to read out the map data in which the upper limit value of the target rotational speed of the engine that is based on the operation on the accelerator operation tool is smaller than in the map data that is read out if it has been determined by the travelling state determination unit that the travelling body is not in the reverse travelling state.

With this configuration, appropriate map data is selected in accordance with the travelling state of the travelling body or the like from among the multiple sets of map data indicating a relationship between the operation amount of the accelerator operation tool and the target rotational speed of the engine, and the rotational speed of the engine is controlled. Therefore, appropriate engine control can be achieved in accordance with the travelling state or the like of the travelling body that may possibly change with the lapse of time. If the travelling body is in the reverse travelling state, the rotational speed of the engine is controlled based on the map data in which the upper limit value of the target rotational speed of the engine is small compared with the case where the travelling body is not in the reverse travelling state. Accordingly, in the case where the travelling body is in the reverse travelling state, the target rotational speed of the engine does not excessively increase, and the driving torque of the travelling apparatus does not become excessively large.

In the present invention, it is favorable to further include the following configuration, that is, the above work vehicle wherein, in the map data that is read out by the control unit if it has been determined by the travelling state determination unit that the work vehicle is in the reverse travelling state, the target rotational speed of the engine is set to be small over an entire operating range of the accelerator operation tool, compared with the map data that is read out by the control unit if it has been determined by the travelling state determination unit that the work vehicle is not in the reverse travelling state.

With this configuration, if the travelling body is in the reverse travelling state, the target rotational speed of the engine over the entire operating range of the accelerator operation tool is small compared with the case where the travelling body is not in the reverse travelling state. Therefore, even at the time of low-speed reverse travelling during which the operation amount of the accelerator operation tool is relatively small, the target rotational speed of the engine is suppressed to be small, and the driving torque of the travelling apparatus can be suppressed to be small.

In the present invention, it is favorable to further include the following configuration, that is, the above work vehicle wherein, in the map data that is read out by the control unit if it has been determined by the travelling state determination unit that the work vehicle is in the reverse travelling state, the target rotational speed of the engine in a range where the target rotational speed of the engine that is based on the operation on the accelerator operation tool does not exceed the upper limit value in an operating range of the accelerator operation tool is set to be the same, and the target rotational speed of the engine in a remaining range in the operating range of the accelerator operation tool is set to be smaller, compared with the map data that is read out by the control unit if it has been determined by the travelling state determination unit that the work vehicle is not in the reverse travelling state.

With this configuration, if the operation amount of the accelerator operation tool is not more than a certain level, the target rotational speed of the engine relative to the operation amount of the accelerator operation tool is equal in both the case where the travelling body is in the reverse travelling state and the case where the travelling body is in the forward travelling state. Thus, at the time of travelling at a relatively low speed, the same operation feed when operating the accelerator operation tool can be achieved when in the reverse travelling state and the frontward travelling state of the travelling body. If the operation amount of the accelerator operation tool exceeds a certain level, the target rotational speed of the engine relative to the operation amount of the accelerator operation tool in the case where the travelling body is in the reverse travelling state is small compared with the case where the travelling body is in the forward travelling state, and the driving torque of the travelling apparatus can be suppressed to be small.

In the present invention, it is favorable to further include the following configuration, that is, the above work vehicle wherein a ratio of a reduction ratio when in the reverse travelling state to a smallest reduction ratio when in the forward travelling state is set to be substantially equal to a ratio of the upper limit value of the target rotational speed of the engine when in the reverse travelling state to the upper limit value of the target rotational speed of the engine when in the forward travelling state.

With this configuration, the highest travelling speed in the case where the travelling body is in the reverse travelling state can be made substantially equal to the highest travelling speed in the case where the travelling body is in the forward travelling state. Thus, the operator's desire to cause the travelling body to travel in reverse at a high speed can be appropriately satisfied, while suppressing the driving torque of the travelling apparatus in the case where the travelling body is in the reverse travelling state.

BRIEF DESCRIPTION OF THE DRAWINGS

FIG. 6 is a comparative diagram for comparing map data for a forward travelling state with map data for a reverse travelling state.
FIG. 7 is a comparative diagram for comparing map data in the case of executing idle-up with map data in the case of not executing idle-up.
FIG. 8 is a diagram showing exemplary relationships between respective travelling states of a travelling body, the highest rotational speed of an engine, a reduction ratio, the highest driving torque, and the highest travelling speed.
FIG. 10 is a comparative diagram for comparing map data for the forward travelling state and map data for the reverse travelling state according to another embodiment.

DETAILED DESCRIPTION OF THE PREFERRED EMBODIMENTS

Hereinafter, an embodiment, which is an example of the present invention, will be described.

Figure 1:
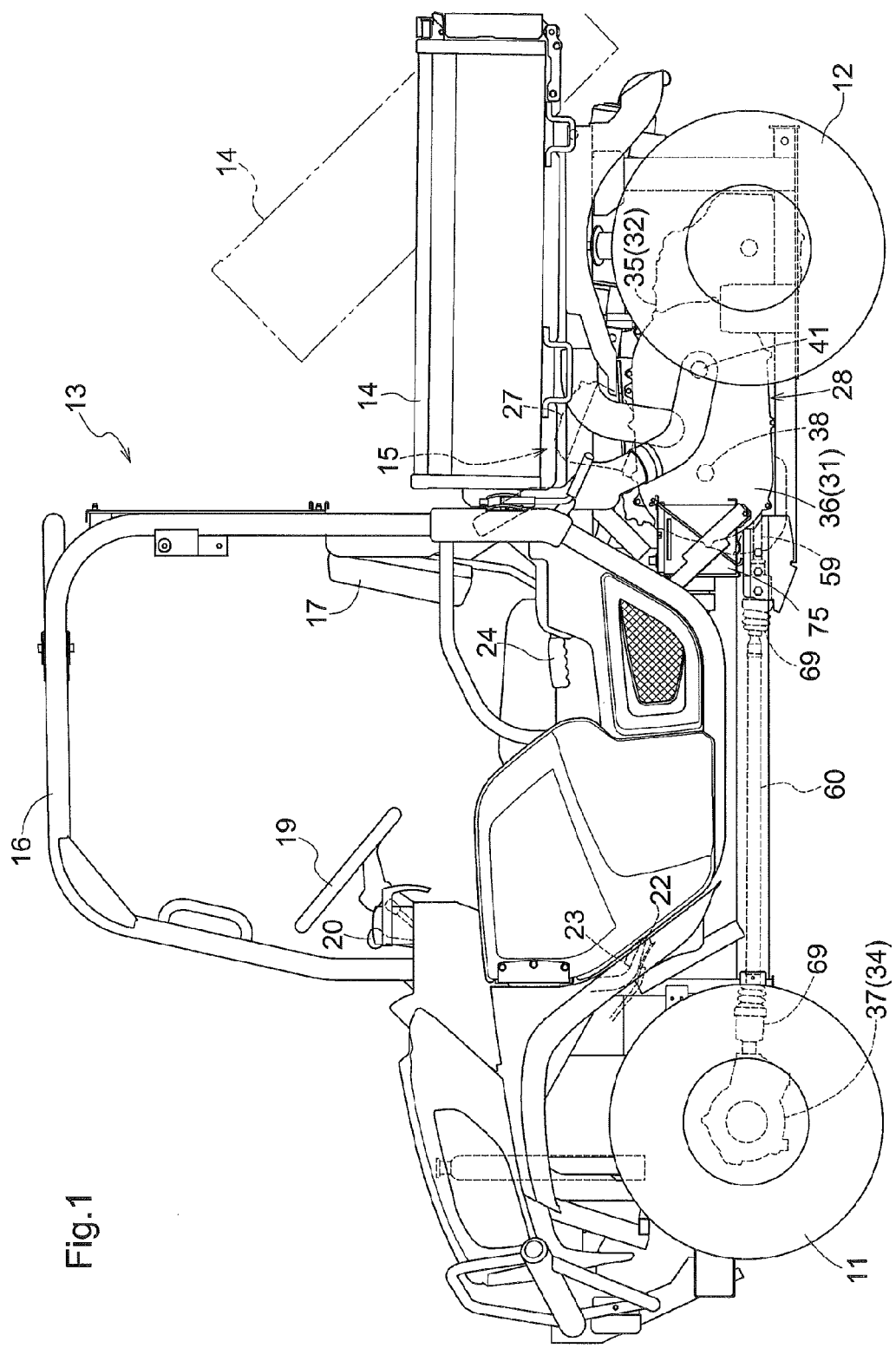
FIG. 1 is a side view of a utility vehicle.
Figure 2:
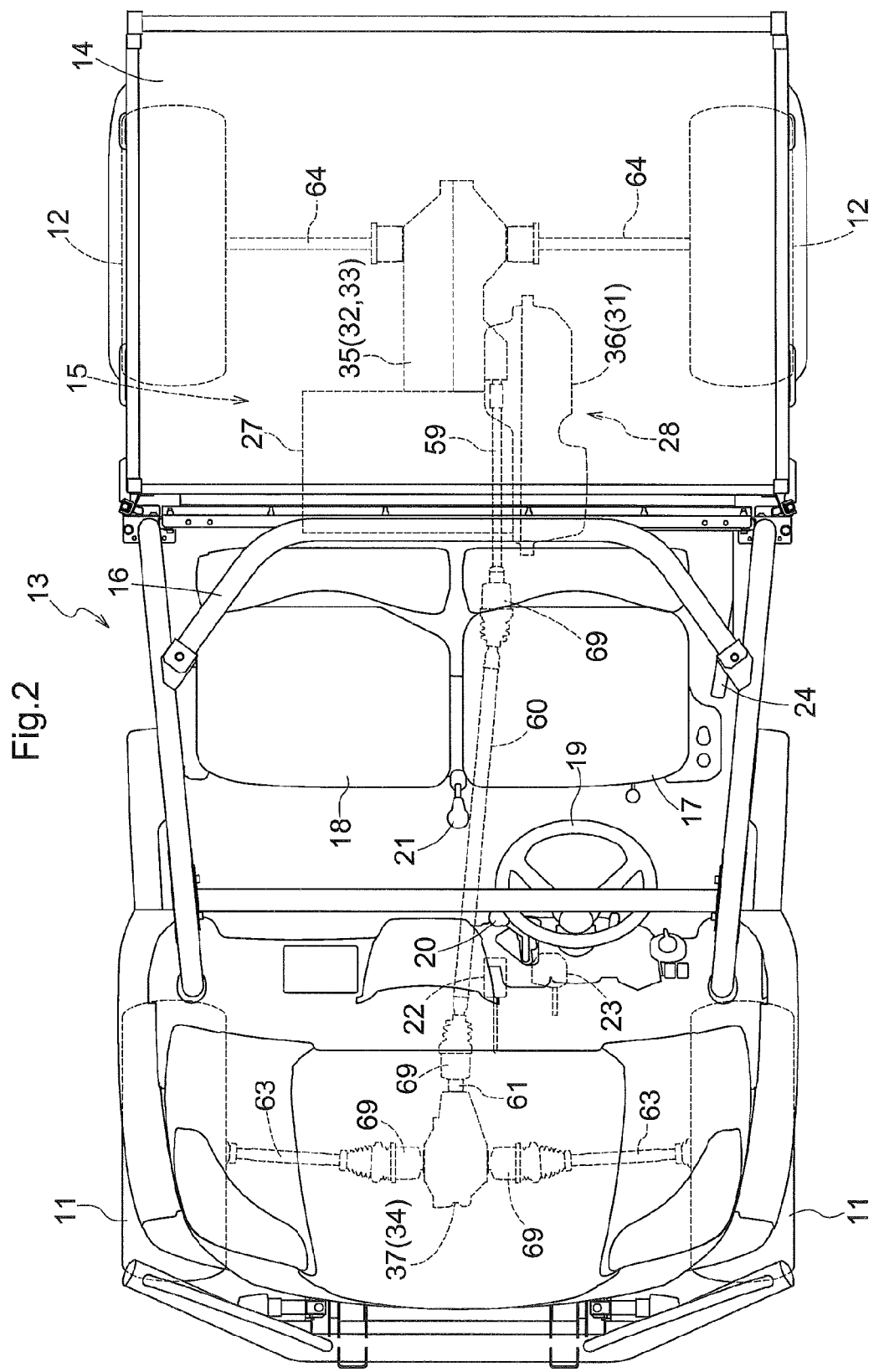
FIG. 2 is a plan view of the utility vehicle.

A utility vehicle (exemplary "work vehicle") shown diagrams such as FIGS. 1 and 2 is configured to be a vehicle that can be used for various purposes, such as haulage and recreation. The utility vehicle is provided with a pair of left and right front wheels 11 (exemplary "travelling apparatuses") that can be driven and steered, and a pair of left and right rear wheels 12 (exemplary "travelling apparatuses") that can be driven. That is to say, a travelling body of the utility vehicle is configured to be able to travel by means of the pair of left and right front wheels 11 and the pair of left and right rear wheels 12. A driving unit 13, into which an operator gets for performing a driving operation, is provided in a center part of the travelling body. A bed 14 on which load can be placed is provided in a rear part of the travelling body. A motor unit 15 is provided below the bed 14 in the travelling body.

The driving unit 13 is surrounded and protected by a frame-shaped protection frame 16. The driving unit 13 is provided with a driving seat 17 on which the operator sit, and an auxiliary seat 18 that is arranged adjacent to the driving seat 17 and on which an assistant can sit. The driving unit 13 is also provided with, as operation input devices, a steering wheel 19 for steering operation for the left and right front wheels 11, a gear shift lever 20 (exemplary "gear shift operation tool") for a gear shift operation, a drive switching lever 21 for switching the drive, an accelerator pedal 22 (exemplary "accelerator operation tool") capable of controlling the travelling speed, a brake pedal 23 for braking control, and a parking lever 24 that enables a parking-brake operation. The driving unit 13 is also provided with, as notification devices, a meter panel 25 (see FIG. 5) capable of visually displaying various kinds of information, and a buzzer device 26 (see FIG. 5) that generates warning sounds or the like.

As shown in FIG. 1, the bed 14 is configured to be able to discharge a load to the rear side in a dumping manner by being lifted up on the front end side. Specifically, the bed 14 is configured to be able to pivot around a lateral axis that is located on the rear end side and extends in a body left-right direction, by operating a hydraulic actuator (not shown) located on the front end side of the bed 14.

Figure 3:
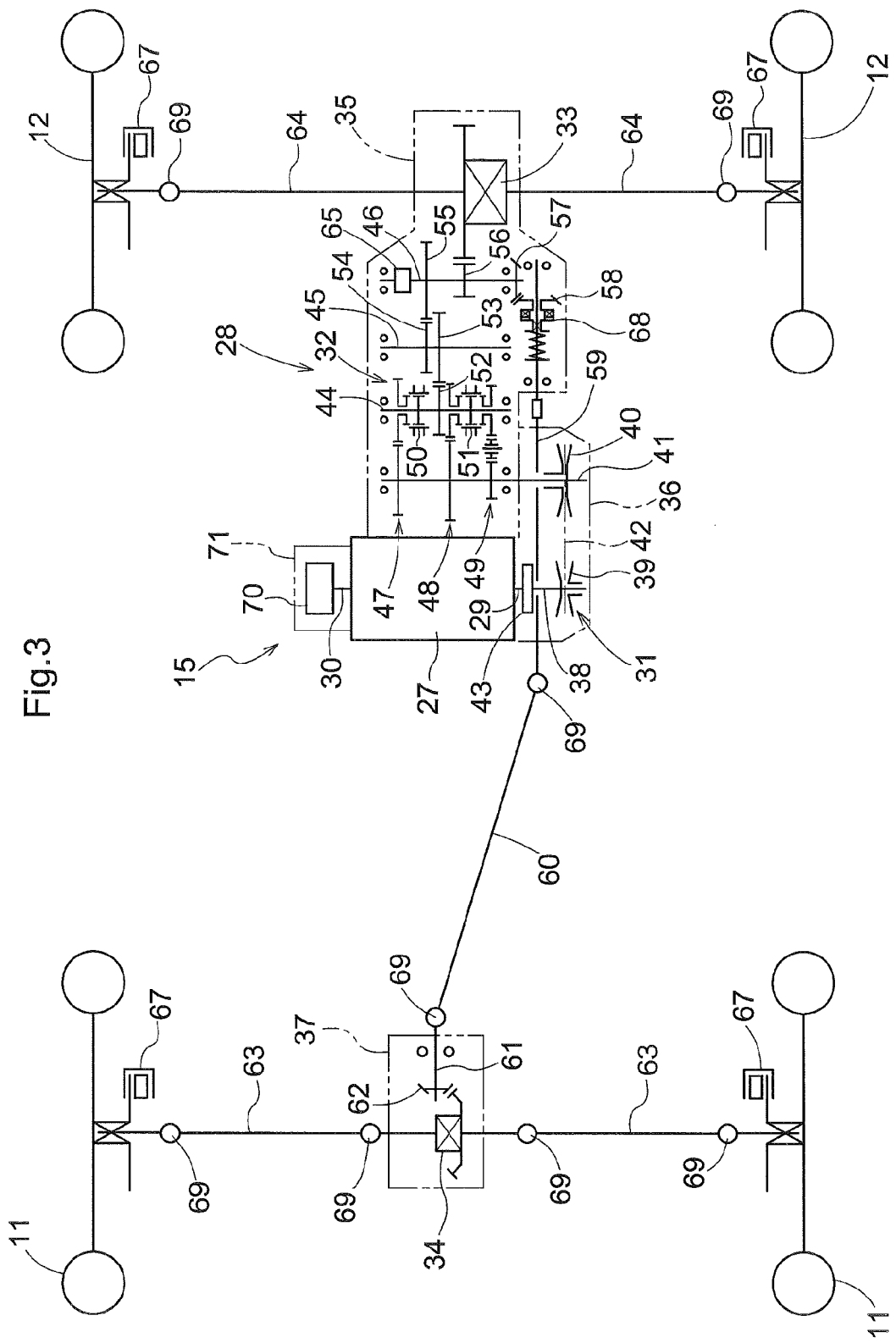
FIG. 3 is a plan view schematically showing a power transmission structure.

The motor unit 15 shown in diagrams such as FIGS. 1 to 3 is provided with a water-cooled gasoline engine (exemplary "engine", which will be hereinafter abbreviated as an engine 27), and a transmission 28 that can convert the power of the engine 27 into forward travelling power or reverse travelling power and output the converted power.

The engine 27 shown in diagrams such as FIG. 3 is arranged in a posture that causes a crankshaft to be oriented laterally relative to the body. The engine 27 is provided with a main output shaft 29, which is integrated with the crankshaft, and an auxiliary output shaft 30, which is also integrated with the crankshaft. The auxiliary output shaft 30 is located on the side opposite to the main output shaft 29 with the crankshaft therebetween. The engine 27 is arranged in a rearward-inclining posture in which the engine 27 tilts obliquely upward to the rear side, i.e., a rear part of the engine is located upward.

Regarding the Transmission

As shown in FIG. 3, the transmission 28 is provided with a dry belt-type continuously variable transmission mechanism 31, a gear-type transmission mechanism 32, a rear wheel differential mechanism 33, and a front wheel differential mechanism 34. The pair of left and right front wheels 11 and the pair of left and right rear wheels 12 can be driven by the power that is output from the transmission 28.

The gear-type transmission mechanism 32 and the rear wheel differential mechanism 33 are housed in a transmission case 35, which is arranged adjacent to the rear side of the engine 27. The belt-type continuously variable transmission mechanism 31 is housed in a gear shift case 36, which is arranged on the lateral side of the engine 27 and the transmission case 35. The front wheel differential mechanism 34 is housed in a front differential case 37, which is arranged on the front side of the engine 27.

The belt-type continuously variable transmission mechanism 31 is provided with a drive pulley 39 that is attached to a drive shaft 38 capable of being connected in tandem with the main output shaft 29 of the engine 27, a driven pulley 40 that is attached to an input shaft 41 of the gear-type transmission mechanism 32, and an endless belt 42 that is installed around the drive pulley 39 and the driven pulley 40 and is made of rubber, for example.

A centrifugal clutch 43 is provided between the main output shaft 29 of the engine 27 and the drive shaft 38 of the drive pulley 39. The centrifugal clutch 43 is in a disconnected state when the rotational speed of the main output shaft 29 of the engine 27 is smaller than a set value, and does not transmit the rotational power of the main output shaft 29 of the engine 27 to the drive shaft 38 of the drive pulley 39. The centrifugal clutch 43 is in a connected state when the rotational speed of the main output shaft 29 of the engine 27 is greater than or equal to the set value, and transmits the rotational power of the main output shaft 29 of the engine 27 to drive shaft 38 of the drive pulley 39.

That is to say, if the rotational speed of the engine 27 is smaller than the set value, the belt-type continuously variable transmission mechanism 31 does not transmit the power. The belt-type continuously variable transmission mechanism 31 is configured such that, as the rotational speed of the engine 27 increases beyond the set value, the belt winding diameter of the drive pulley 39 increases, and the belt winding diameter of the driven pulley 40 decreases. That is to say, the belt-type continuously variable transmission mechanism 31 is configured such that the reduction ratio decreases as the rotational speed of the engine 27 increases from the set value.

The gear-type transmission mechanism 32 is provided with an input shaft 41, a first transmission shaft 44, a second transmission shaft 45, a third transmission shaft 46, a first speed forward travelling gear mechanism 47, a second speed forward travelling gear mechanism 48, a reverse travelling gear mechanism 49, a first selector fork 50, a second selector fork 51, a first transmission gear 52, a first transmitted gear 53, a second transmission gear 54, a second transmitted gear 55, a third transmission gear 56, a first transmission bevel gear 57, a first transmitted bevel gear 58, a power output shaft 59, a propeller shaft 60, a front wheel-side input shaft 61, and a second transmission bevel gear 62.

The first speed forward travelling gear mechanism 47, the second speed forward travelling gear mechanism 48, and the reverse travelling gear mechanism 49 are configured to be integrally driven with the input shaft 41. The first transmission gear 52 is configured to be integrally driven with the first transmission shaft 44. The first transmitted gear 53 and the second transmission gear 54 are configured to be integrally driven with the second transmission shaft 45. The first transmission gear 52 and the first transmitted gear 53 are always meshed with each other. The second transmitted gear 55, the third transmission gear 56, and the first transmission bevel gear 57 are configured to be integrally driven with the third transmission shaft 46. The second transmission gear 54 and the second transmitted gear 55 are always meshed with each other. The third transmission gear 56 is always meshed with an input gear of the rear wheel differential mechanism 33. The first transmitted bevel gear 58 is configured to be integrally driven with a transmission upstream-side portion of the power output shaft 59. The first transmission bevel gear 57 and the first transmitted bevel gear 58 are always meshed with each other. A transmission downstream-side portion of the power output shaft 59 is connected in tandem with the propeller shaft 60. The propeller shaft 60 is connected in tandem with the front wheel-side input shaft 61. The front wheel-side input shaft 61 is configured to be integrally driven with the second transmission bevel gear 62. The second transmission bevel gear 62 is always meshed with a transmitted bevel gear of the front wheel differential mechanism 34.

Front wheel drive shafts 63, which extend in the body left-right direction, are respectively connected in tandem with the left and the right of the front wheel differential mechanism 34. The front wheels 11 are rotatably supported by ends of the respective front wheel drive shafts 63. Rear wheel drive shafts 64, which extend in the body left-right direction, are respectively connected in tandem with the left and the right of the rear wheel differential mechanism 33. The rear wheels 12 are rotatably supported by ends of the respective rear wheel drive shafts 64.

Figure 5:
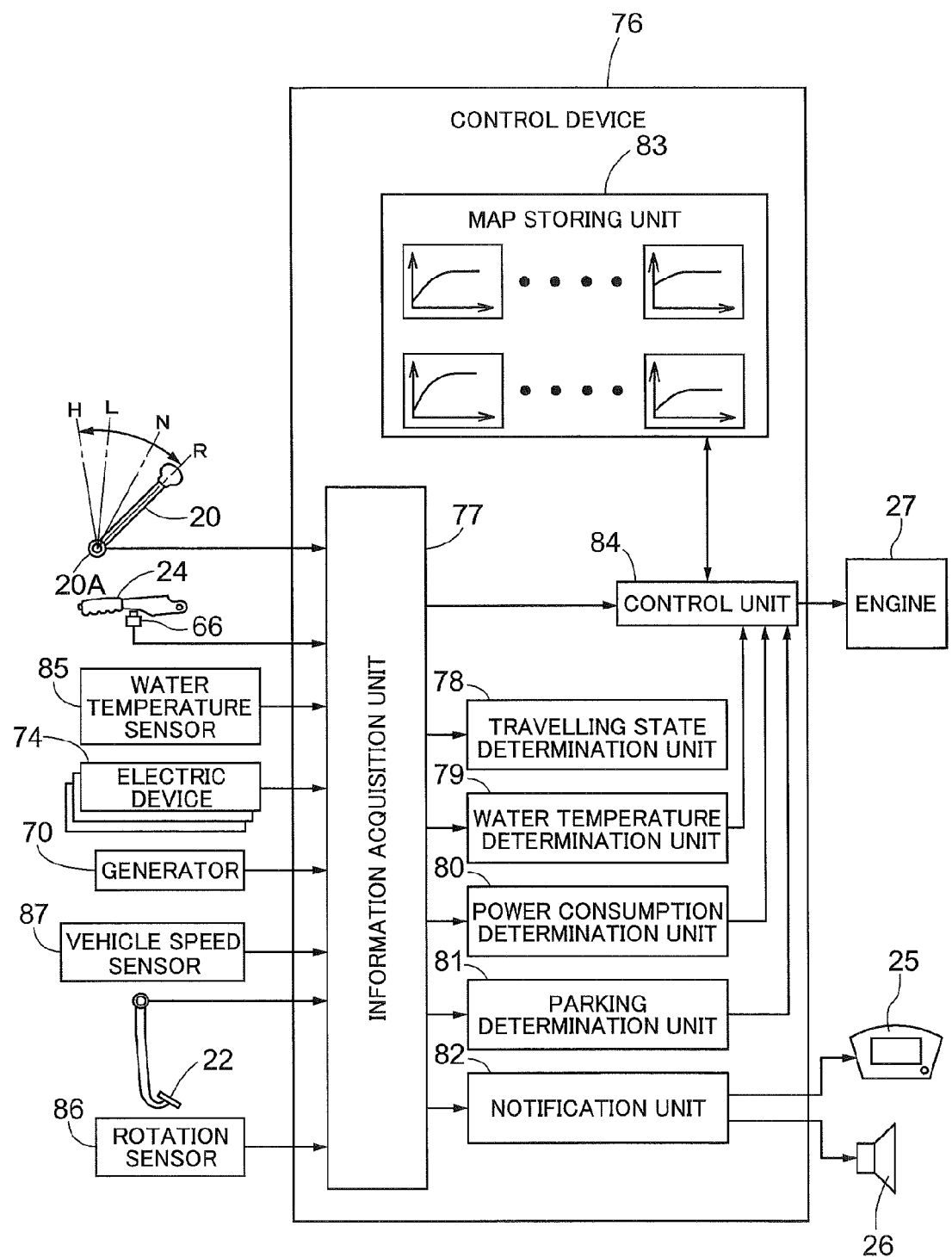
FIG. 5 is a control configuration diagram related to engine control.

The third transmission shaft 46 is provided with a parking mechanism 65 that is connected in tandem with the parking lever 24 (see FIGS. 1, 2, and 5). The parking mechanism 65 is constituted by a wet multi-disc brake mechanism. Upon the parking lever 24 being operated to a braking side, the parking mechanism 65 enters a braking state, the braking force is exerted on the third transmission shaft 46, and the travelling body enters a parked state. On the other hand, upon the parking lever 24 being operated to a release side, the parking mechanism 65 enters a released state, the third transmission shaft 46 can then freely rotate, and the travelling body enters a parking-released state.

Upon the parking lever 24 being operated to the braking side, a parking switch 66 (see FIG. 5), which is arranged near the parking lever 24, turns on. On the other hand, upon the parking lever 24 being operated to the release side, the parking switch 66 turns off.

As shown in FIG. 3, brake apparatuses 67, each of which is constituted by a disc brake mechanism, are provided respectively for the left and right front wheels 11 and the left and right rear wheels 12. The brake apparatuses 67 are connected in tandem with the brake pedal 23 (see FIGS. 1 and 2) via a master cylinder (not shown). Upon pressing down the brake pedal 23, the brake apparatuses 67 enter a braking state, and the braking force is exerted on the left and right front wheels 11 and the left and right rear wheels 12. On the other hand, if the brake pedal 23 is not pressed down, the brake apparatuses 67 are in a released state, and the braking force is not exerted on the left and right front wheels 11 and the left and right rear wheels 12.

As shown in FIG. 3, the power output shaft 59 is provided with a clutch device 68. The clutch device 68 is linked to the drive switching lever 21 (see FIG. 2). Upon operating the drive switching lever 21 to a four-wheel drive position and activating the clutch device 68, the transmission upstream-side portion of the power output shaft 59 is connected in tandem with the transmission downstream-side portion thereof, and a state where the power is transmitted to the front wheels 11 side (i.e., a four wheel driving state) is achieved. On the other hand, upon operating the drive switching lever 21 to a two-wheel drive position and deactivating the clutch device 68, the connection between the transmission upstream-side portion and the transmission downstream-side portion of the power output shaft 59 in tandem with each other is released, and a state where power is not transmitted from the power output shaft 59 to the front wheels 11 side (i.e., a two wheel driving state) is entered.

As shown in FIG. 3, the rear wheel drive shafts 64 and the rear wheels 12, the power output shaft 59 and the propeller shaft 60, the propeller shaft 60 and the front wheel-side input shaft 61, the front wheel differential mechanism 34 and the left and right front wheel drive shafts 63, and the front wheel drive shafts 63 and the front wheels 11 are respectively connected in tandem with each other by universal joints 69 such as Cardan joints.

The gear-type transmission mechanism 32 of the above-described transmission 28 can be operated by the gear shift lever 20 (see FIG. 5). Specifically, the first selector fork 50 and the second selector fork 51 are connected in tandem with the gear shift lever 20.

As a result of operating the gear shift lever 20 shown in FIG. 5 to a first speed forward travelling position L (exemplary "forward travelling position"), the first speed forward travelling gear mechanism 47 is connected in tandem with the second transmission shaft 45 by the first selector fork 50 shown in FIG. 3, and a state where the transmission 28 can output first speed forward travelling power (exemplary "forward travelling power") is achieved. Upon pressing down the accelerator pedal 22 in this state, the travelling body travels in a first speed forward travelling state (exemplary "forward travelling state").

As a result of operating the gear shift lever 20 shown in FIG. 5 to a second speed forward travelling position H (exemplary "forward travelling position"), the second speed forward travelling gear mechanism 48 is connected in tandem with the second transmission shaft 45 by the second selector fork 51 shown in FIG. 3, and a state where the transmission 28 can output second speed forward travelling power (exemplary "forward travelling power") is achieved. Upon pressing down the accelerator pedal 22 in this state, the travelling body travels in a second speed forward travelling state (exemplary "forward travelling state").

As a result of operating the gear shift lever 20 shown in FIG. 5 to a reverse travelling position R, the reverse travelling gear mechanism 49 is connected in tandem with the second transmission shaft 45 by the second selector fork 51 shown in FIG. 3, and a state where the transmission 28 can output reverse travelling power is achieved. Upon pressing down the accelerator pedal 22 in this state, the travelling body travels in a reverse travelling state.

As a result of operating the gear shift lever 20 shown in FIG. 5 to a neutral position N, none of the first speed forward travelling gear mechanism 47, the second speed forward travelling gear mechanism 48, and the reverse travelling gear mechanism 49 is connected in tandem with the second transmission shaft 45 by the first selector fork 50 or the second selector fork 51 shown in FIG. 3, and a neutral state where the transmission 28 does not output power is achieved. When in this state, the travelling body is in a stopped state.

Regarding the Generator

Figure 4:
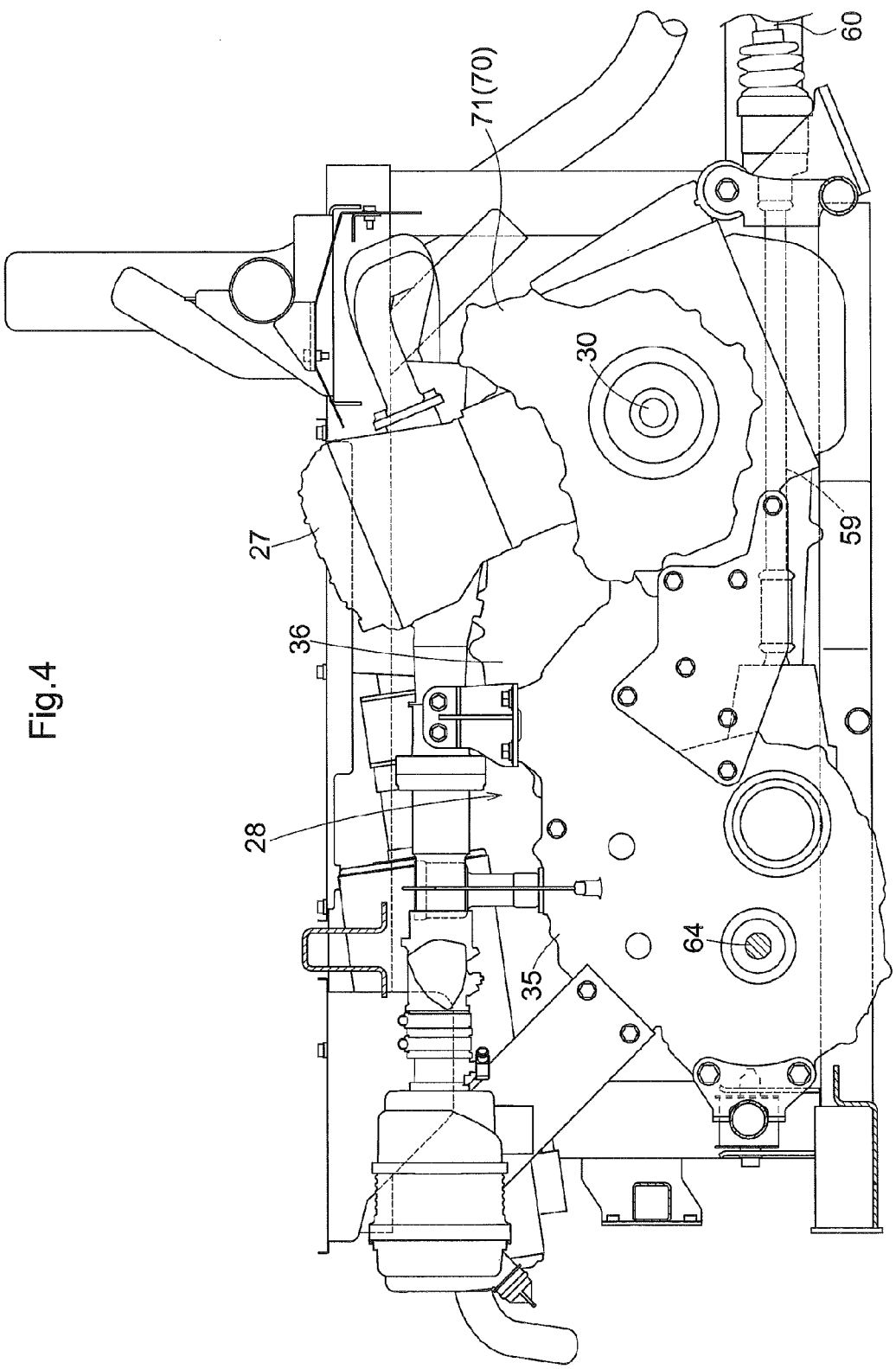
FIG. 4 is a side view showing the periphery of a generator.

As shown in FIGS. 3 and 4, a generator 70 that generates power using the rotational power of the engine 27 is provided on the lateral side of the transmission case 35 that is located on the rear side of the auxiliary output shaft 30 of the engine 27. The generator 70 is directly connected to the auxiliary output shaft 30 of the engine 27. The periphery of the generator 70 is covered by a generator cover 71, which is located in a side part of the engine 27. The power generated by the generator 70 based on the rotational driving of the auxiliary output shaft 30 of the engine 27 is supplied to the electric devices 74 (see FIG. 5) and the battery 75 (see FIG. 1) provided in the travelling body.

Regarding the Control Configuration

As shown in FIG. 5, the utility vehicle is provided with a control device 76 that is constituted by an ECU (Electric Control Unit) and controls the engine 27, for example. The control device 76 is provided with an information acquisition unit 77, a travelling state determination unit 78, a water temperature determination unit 79, a power consumption determination unit 80, a parking determination unit 81, a notification unit 82, a map storing unit 83, and a control unit 84.

The information acquisition unit 77 acquires information from various sensors and the like. Specifically, the information acquisition unit 77 acquires various kinds of information, such as information regarding an operation position of the gear shift lever 20 detected by a potentiometer 20A, information regarding the turning on and off of the parking switch 66 for detecting a state of the parking lever 24, temperature information obtained by a water temperature sensor 85 for measuring cooling water temperature of the engine 27, information regarding power consumption of various electric devices 74, information regarding the operation amount of the accelerator pedal 22, information obtained by a rotation sensor 86 for detecting the actual rotational speed of the engine 27, and information obtained by a vehicle speed sensor 87 for detecting the vehicle speed of the travelling body.

The travelling state determination unit 78 acquires the information regarding the operation position of the gear shift lever 20 from the information acquisition unit 77, and determines a travelling state of the travelling body based on this information. Specifically, if the gear shift lever 20 is located at the reverse travelling position R, the travelling state determination unit 78 determines that the travelling body is in a reverse travelling state. If the gear shift lever 20 is located in the first speed forward travelling position L, the travelling state determination unit 78 determines that the travelling body is in the first speed forward travelling state. If the gear shift lever 20 is located in the second speed forward travelling position H, the travelling state determination unit 78 determines that the travelling body is in the second speed forward travelling state. If the gear shift lever 20 is located at the neutral position N, the travelling state determination unit 78 determines that the travelling body is in the stopped state. The travelling state determination unit 78 outputs this determination information to the control unit 84.

The water temperature determination unit 79 determines whether or not the water temperature exceeds a threshold value. The water temperature determination unit 79 acquires information regarding the water temperature measured by the water temperature sensor 85 from the information acquisition unit 77, determines whether or not this water temperature exceeds the threshold value, and outputs this determination information to the control unit 84.

The power consumption determination unit 80 determines whether or not the total power consumption in the travelling body exceeds the power generation amount. Specifically, the power consumption determination unit 80 acquires information regarding power consumption of the respective electric devices 74 and information regarding power generation amount of the generator 70 from the information acquisition unit 77, determines whether or not the total power consumption, which is the total of the power consumption of the electric devices 74, exceeds the power generation amount of the generator 70, and outputs information regarding this determination to the control unit 84.

The parking determination unit 81 determines whether or not the travelling body is in a parked state. Specifically, the parking determination unit 81 acquires information regarding the turning on and off of the parking switch 66 from the information acquisition unit 77, determines whether or not the parking switch 66 is in an on-state, and outputs information regarding this determination to the control unit 84.

The notification unit 82 acquires, from the information acquisition unit 77, information regarding the turning on and off of the parking switch 66, and information regarding the vehicle speed of the travelling body detected by the vehicle speed sensor 87, and performs various kinds of notification (the detail thereof will be described later).

As shown in FIGS. 5 to 7, multiple sets of map data indicating a relationship between the operation amount of the accelerator pedal 22 and the target rotational speed of the engine 27 are stored in the map storing unit 83. As the map data, multiple sets of data in which the idling rotational speed, the upper limit value of the target rotational speed of the engine 27, the increase ratio of the target rotational speed of the engine 27 relative to the operation amount of the accelerator pedal 22, and the like are different are prepared in advance.

The control unit 84 reads out, from the map storing unit 83, corresponding map data when appropriate based on the information regarding the travelling state of the travelling body or the like, or specifically, the information that is input from the travelling state determination unit 78, the water temperature determination unit 79, the power consumption determination unit 80, the parking determination unit 81, and the notification unit 82. The control unit 84 then controls the rotational speed of the engine 27 such that the actual rotational speed of the engine 27 detected by the rotation sensor 86 approaches the target rotational speed of the engine 27 corresponding to the operation amount of the accelerator pedal 22 acquired from the information acquisition unit 77, based on the map data that is selectively read out from the map storing unit 83. That is to say, the target rotational speed of the engine 27 can be changed by operating the accelerator pedal 22 based on the currently read map data.

Regarding Restriction of the Upper Limit Value of the Target Rotational Speed of the Engine at the Time of Reverse Travelling If it has been determined by the travelling state determination unit 78 that the travelling body is in the reverse travelling state, the control unit 84 reads out, from the map storing unit 83, map data in which the upper limit value of the target rotational speed of the engine 27 that is based on an operation on the accelerator pedal 22 is smaller than in map data that is read out if it is determined by the travelling state determination unit 78 that the travelling body is not in the reverse travelling state (i.e., the travelling body is in any of the first speed forward travelling state, the second speed forward travelling state, and the neutral state), and controls the rotational speed of the engine 27 based on the map data with the smaller upper limit value.

That is to say, the control unit 84 is configured such that, if the gear shift lever 20 has been operated to the reverse travelling position R and it has been determined by the travelling state determination unit 78 that the travelling body is in the reverse travelling state, the control unit 84 restricts the upper limit value of the target rotational speed of the engine 27 that is based on the operation on the accelerator pedal 22 to a lower value than in the case where it has been determined by the travelling state determination unit 78 that the travelling body is in the forward travelling state.

As shown in FIG. 6, a second upper limit value M2 of the target rotational speed of the engine 27 in the map data (map data denoted by a solid line in FIG. 6) used if it has been determined by the travelling state determination unit 78 that the travelling body is in the reverse travelling state is set to be smaller than a first upper limit value M1 of the target rotational speed of the engine 27 in the map data (map data denoted by an chain double-dashed line in FIG. 6) that is read out if it has been determined by the travelling state determination unit 78 that the travelling body is not in the reverse travelling state (e.g., in the forward travelling state).

Furthermore, as shown in FIG. 6, in the map data (the map data denoted by the solid line in FIG. 6) that is read out by the control unit 84 if it has been determined by the travelling state determination unit 78 that the travelling body is in the reverse travelling state, the target rotational speed of the engine 27 is set to be small over the entire operating range of the accelerator pedal 22, compared with the map data (the map data denoted by the chain double-dashed line in FIG. 6) that is read out by the control unit 84 if it has been determined by the travelling state determination unit 78 that the travelling body is not in the reverse travelling state (e.g., the travelling body is in the forward travelling state).

Thus, if the travelling body is in the reverse travelling state, the driving torque of the travelling apparatuses (the front wheels 11 and the rear wheels 12) is small over the entire operating range of the accelerator pedal 22, compared with the case where the travelling body is not in the reverse travelling state (in the forward travelling state). As a result, for example, when parking the travelling body while causing the travelling body to travel in reverse, the occurrence of inconvenience such as the rear wheels 12 riding up a wheel stopper can be avoided.

Regarding Setting of the Reduction Ratio

Here, in the above-described transmission 28, the ratio of the reduction ratio in the case where the travelling body is in the reverse travelling state to the smallest reduction ratio in the case where the travelling body is in the forward travelling state (i.e., the reduction ratio in the case of the second speed forward travelling state) is set to be substantially equal to the ratio of the upper limit value of the target rotational speed of the engine 27 in the case where the travelling body is in the reverse travelling state to the upper limit value of the target rotational speed of the engine 27 in the case where the travelling body is in the forward travelling state.

For this reason, comparing the case where the travelling body is in the forward travelling state with the case of the reverse travelling state with respect to the same travelling speed, the driving torque of the travelling apparatuses (the front wheels 11 and the rear wheels 12) is smaller in the case of the reverse travelling state than in the case of the forward travelling state. Also, the highest travelling speed of the reverse travelling in the case where the travelling body is in the reverse travelling state is substantially equal to the highest travelling speed of the forward travelling in the case where the travelling body is in the second speed forward travelling state.

This setting of the reduction ratio is achieved by appropriately configuring a setting of the transmission gear ratio (reduction ratio) in the belt-type continuously variable transmission mechanism 31, a setting of the gear ratio (reduction ratio) in the second speed forward travelling gear mechanism 48, and a setting of the gear ratio (reduction ratio) in the reverse travelling gear mechanism 49.

FIG. 8 shows, as a reference, exemplary relationships between the upper limit value of the target rotational speed of the engine 27, the reduction ratio, the highest driving torque of the travelling apparatuses (the front wheels 11 and the rear wheels 12), and the highest travelling speed in the reverse travelling state, the neutral state, the first speed forward travelling state, and the second speed forward travelling state of the travelling body. In FIG. 8, e, r, t, and v are variables for indicating ratios of the respective values in the reverse travelling state, the neutral state, the first speed forward travelling state, and the second speed forward travelling state.

Regarding Idle-Up Control of the Engine

If the accelerator pedal 22 is in a non-operation state (e.g., in a state of not being pressed down), the engine 27 is in an unload state, and the rotational speed of the engine 27 is an idling rotational speed.

If determination information indicating that the total power consumption does not exceed the power generation amount has been input from the power consumption determination unit 80, and determination information indicating that the water temperature does not exceed the threshold value has been input from the water temperature determination unit 79, the control unit 84 reads out, from the map storing unit 83, map data in which a first idling rotational speed I1, which is a normal idling rotational speed in the case of not executing idle-up is set (map data denoted by an chain double-dashed line in FIG. 7), and controls the rotational speed of the engine 27 based on this map data in which the first idling rotational speed I1 is set.

If determination information indicating that the total power consumption exceeds the power generation amount has been input from the power consumption determination unit 80, the control unit 84 reads out, from the map storing unit 83, map data in which a second idling rotational speed I2 in the case of performing idle-up is set, the second idling rotational speed I2 having a value larger than the value of the first idling rotational speed I1 (map data indicated by a solid line in FIG. 7), and controls the rotational speed of the engine 27 based on this map data in which the second idling rotational speed I2 is set. Thus, even if the electric devices 74 such as an in-vehicle heater (see FIG. 5) are greatly operated during idling, the idling rotational speed of the engine 27 automatically increases if the power consumption increases. Therefore, the power generation amount of the generator 70 is sufficiently ensured, and a drop in the voltage of the battery 75 (see FIG. 1) can be inhibited.

Furthermore, if determination information indicating that the water temperature exceeds the threshold value has been input from the water temperature determination unit 79, the control unit 84 similarly reads out, from the map storing unit 83, the map data in which the second idling rotational speed I2 having a value larger than the value of the first idling rotational speed I1 is set (the map data denoted by the solid line in FIG. 7), and controls the rotational speed of the engine 27 based on this map data in which the second idling rotational speed I2 is set. Thus, even in an environment where the peripheral temperature is low, such as in a cold region, the engine 27 can automatically be quickly warmed up.

Regarding Control at the Time of Parking

If it is determined that the parking switch 66 is in an on-state, the notification unit 82 shown in FIG. 5 performs an warning display with a visual display device, such as a lamp 88 provided in the meter panel 25. Thus, the operator is visually notified that the travelling body is in the parked state.

If it is determined that the parking switch 66 is in an on-state and that vehicle speed is being detected, the notification unit 82 causes the buzzer device 26 to generate a warning sound in addition to performing the warning display with the visual display device such as the lamp 88 provided in the meter panel 25. Thus, if the operator is about to accidentally start travelling of the travelling body despite the travelling body being in a parked state, a warning is issued to the operator using sound in addition to the warning display with the visual display device. Thus, the travelling of the travelling body being started while the parking mechanism 65 remains in the braking state is inhibited, and the occurrence of a situation where an excessive load is applied to the parking mechanism 65 constituted by a wet multi-disc brake mechanism can be favorably avoided.

Upon acquiring information indicating that the parking switch 66 is in the on-state, the control unit 84 reads out map data corresponding to the on-state of the parking switch 66 from the map storing unit 83, and controls the rotational speed of the engine 27 based on this map data. Specifically, in the map data corresponding to the on-state of the parking switch 66, the upper limit value of the target rotational speed of the engine 27 is restricted to a value that is smaller than the aforementioned first upper limit value M1 and second upper limit value M2 and with which an excessive load is not applied to the parking mechanism 65. Thus, even if the travelling of the travelling body is started while the parking mechanism 65 remains in the braking state, since the power that is output from the engine 27 is suppressed to a small level, an excessive load is not applied to the parking mechanism 65, and the occurrence of inconvenience such as seizing up in the parking mechanism 65 can be avoided.

Other Embodiments

Other embodiments, which are modifications of the above embodiment, will be described below. The other embodiments below are similar to the above embodiment except items described below. The above embodiment and the other embodiments below can be combined as appropriate as long as there are no inconsistencies. Note that the scope of the present invention is not limited to the content disclosed in the embodiments.

(1) Although the above embodiment has described, as an example, the driving unit 13 provided with the protection frame 16, the driving unit 13 is not limited thereto. For example, other driving units that are provided with a cabin in place of the protection frame 16 may be employed.

Regarding Power Transmission to the Compressor and the Like

Figure 9:
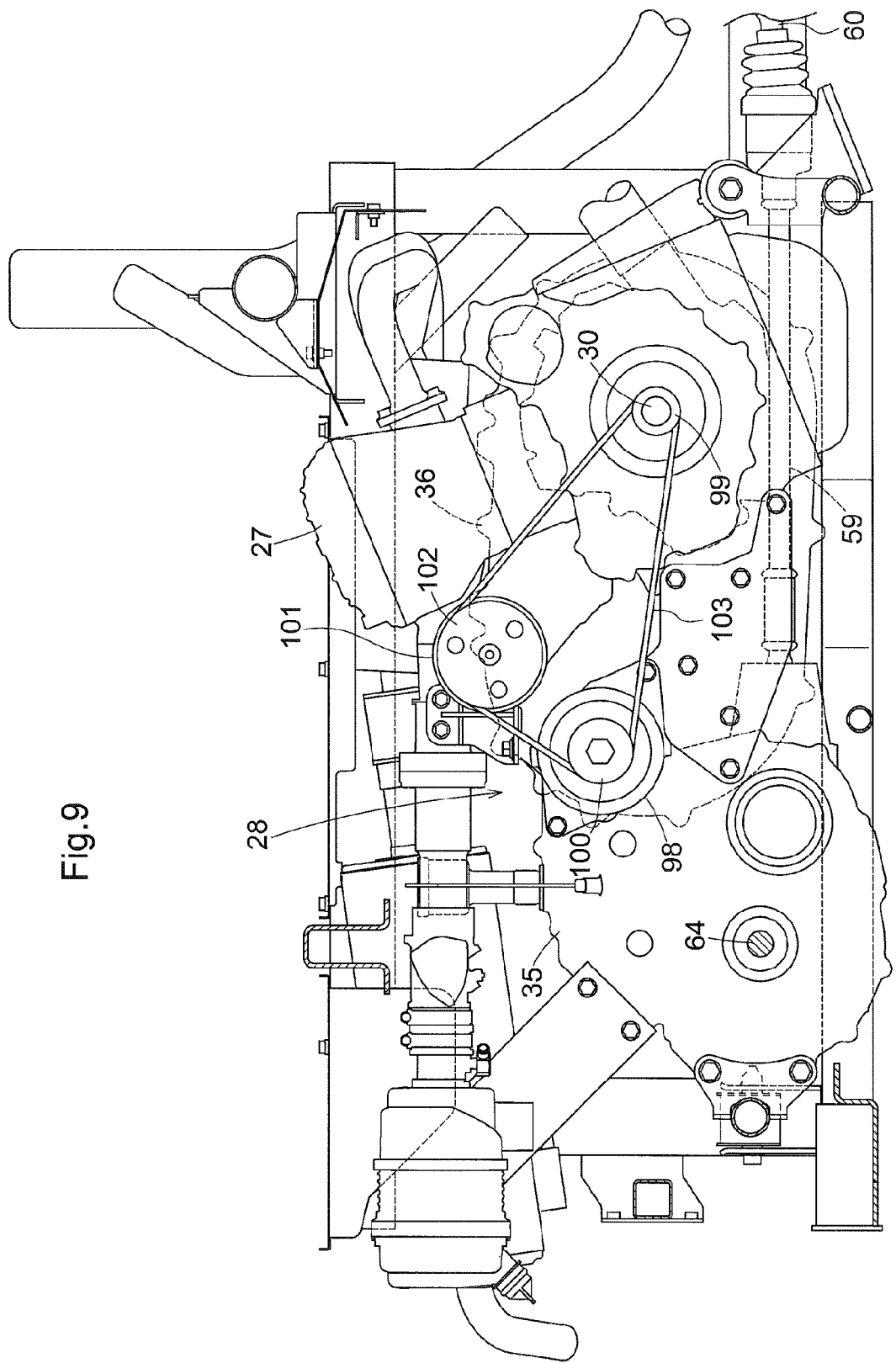
FIG. 9 is a side view showing the periphery of an alternator according to another embodiment.

In the case of employing a driving unit having such a specification that includes a cabin, the number of electric devices 74 to be mounted is larger than in the driving unit 13 having a specification that includes the protection frame 16. For this reason, the driving unit having the specification that includes the cabin is provided, in place of the generator 70, with an alternator 98 (see FIG. 9) that enables larger power generation to be ensured than with the generator 70. As shown in FIG. 9, as one of the electric devices 74 mounted in the case of the specification that includes the cabin, for example, a compressor 101 is provided that is a constituent component of an air conditioning apparatus for performing air-conditioning within the cabin and compresses a coolant using rotational power. The compressor 101 is arranged near the alternator 98.

In this case, the auxiliary output shaft 30 of the engine 27 is provided with an output pulley 99. A power generation input pulley 100 is provided on the alternator 98 side. The compressor 101 is provided with a compression input pulley 102. A transmission belt 103 is installed around the output pulley 99 attached to the auxiliary output shaft 30 of the engine 27, the power generation input pulley 100 of the alternator 98, and the compression input pulley 102 of the compressor 101. The transmission belt 103 is rotationally driven as a result of being driven by the engine, and rotational power is transmitted to both the alternator 98 and the compressor 101.

On the other hand, in the case of a cabin that is not provided with an air conditioning apparatus, the compressor 101 is omitted. In this case, the transmission belt 103 may be installed around the output pulley 99 of the auxiliary output shaft 30 of the engine 27, and the power generation input pulley 100 on the alternator 98 side.

Since the power of the engine 27 is configured to be input to the alternator 98 via the transmission belt 103, it is possible to achieve use of the main structure at the periphery of the alternator 98 for both the specification in which an air conditioning apparatus is mounted and the specification in which an air conditioning apparatus is not mounted.

(2) In the above embodiment, as the map data that is read out by the control unit 84 if it has been determined by the travelling state determination unit 78 that the travelling body is in the reverse travelling state, the map data in which the target rotational speed of the engine 27 is set to be small over the entire operating range of the accelerator pedal 22 compared with the map data that is read out by the control unit 84 if it has been determined by the travelling state determination unit 78 that the travelling body is not in the reverse travelling state (see FIG. 6) has been described as an example. However, the map data is not limited thereto. For example, as shown in FIG. 10, as the map data that is read out by the control unit 84 if it has been determined by the travelling state determination unit 78 that the travelling body is in the reverse travelling state, map data (map data denoted by a solid line in FIG. 10; the upper limit value is the second upper limit value M2) may be used in which the target rotational speed of the engine 27 which is based on operation of the accelerator pedal 22 is set to be the same in a range where the target rotational speed of the engine 27 does not exceed the upper limit value (the second upper limit value M2) in the operating range of the accelerator pedal 22, and the target rotational speed of the engine 27 is set to be small in the remaining range of the operating range of the accelerator pedal 22, compared with map data (map data denoted by an chain double-dashed line in FIG. 10; the upper limit value is the first upper limit value M1) that is read out by the control unit 84 if it has been determined by the travelling state determination unit 78 that the travelling body is not in the reverse travelling state (e.g., in the forward travelling state).

(3) The above embodiment has described, as an example, the control unit 84 that restricts the upper limit value of the target rotational speed of the engine 27 to a low value when in the reverse travelling state compared with the case of the forward travelling state regardless of the travelling speed of the travelling body. However, the control unit 84 is not limited thereto.

For example, if the endless belt 42 of the belt-type continuously variable transmission mechanism 31 has become worn, the transmission gear ratio (reduction ratio) of the belt-type continuously variable transmission mechanism 31 tends to increase, and the rotational speed of the engine 27 corresponding to the travelling speed of the travelling body tends to increase.

For this reason, for example, the control unit 84 may restrict the upper limit value of the target rotational speed of the engine 27 when in the reverse travelling state based on information regarding the vehicle speed of the travelling body detected by the vehicle speed sensor 87, in addition to restricting the upper limit value of the target rotational speed of the engine 27 when in the reverse travelling state to a lower value than in the case of the forward travelling state. In this case, the highest travelling speed of the travelling body in the reverse travelling state is restricted to a certain speed limit that is set in advance.

Thus, when in at least one of a state where the actual rotational speed of the engine 27 reaches the upper limit value of the target rotational speed of the engine 27 in the case of the reverse travelling state and a state where the travelling speed of the travelling body in the reverse travelling state reaches the certain speed limit, the actual rotational speed of the engine 27 does not increase anymore. As a result, the highest travelling speed of the travelling body in the reverse travelling state does not increase beyond a certain level or more.

By setting this speed limit in the reverse travelling state to be a lower value than the highest travelling speed in the case of the second speed forward travelling state, the highest travelling speed of the travelling body in the reverse travelling state can be suppressed to a small value.

(4) Although omitted in the above embodiment, if the driving seat 17 and the auxiliary seat 18 are provided with seat belt apparatuses capable of constraining the bodies of persons who sit thereon, the upper limit value of the target rotational speed of the engine 27 when the seat belt apparatuses are in a state of being used may be changed from that when the seat belt apparatuses are not in a state of not being used. In this case, information regarding whether the seat belt apparatuses are in a state of being used or in a state of not being used is input to the control unit 84 via the information acquisition unit 77.

For example, when the seat belt apparatuses are in a state of being used, the upper limit value of the target rotational speed of the engine 27 is controlled by the control unit 84 as in the above embodiment. In contrast, when the seat belt apparatuses are in a state of not being used, the rotational speed of the engine 27 corresponding to a certain restraint speed of the travelling body that is set in advance is the upper limit value of the target rotational speed of the engine 27, regardless of the travelling state of the travelling body (i.e., regardless of which of the forward travelling state, the reverse travelling state, and the like the travelling body is in). Thus, when the seat belt apparatuses are in a state of not being used, the travelling speed of the travelling body can be suppressed so as not to be larger than the restraint speed.

(5) The above embodiment has described, as an example, the travelling body provided with the accelerator pedal 22 capable of being pressed down as an "accelerator operation tool". However, the travelling body is not limited thereto. For example, other "accelerator operation tools", such as an accelerator lever and an accelerator dial that can be manually operated, may be provided in place of the accelerator pedal 22.

(6) The above embodiment has described, as an example, the travelling body provided with the gear shift lever 20 as the "gear shift operation tool". However, the travelling body is not limited thereto, and may be provided with other "gear shift operation tools" such as a gear shift pedal capable of being pressed down.

(7) The above embodiment has described, as an exemplary "engine", the engine 27 that is a gasoline engine. However, the engine is not limited thereto, and other "engines" such as a diesel engine may be employed.

(8) Although the above embodiment has described the pair of left and right front wheels 11 and the pair of left and right rear wheels 12 as exemplary "travelling apparatuses", the travelling apparatuses are not limited thereto. For example, other "travelling apparatuses" constituted by a pair of left and right crawler travelling apparatuses, or other "travelling apparatuses" constituted by the pair of left and right front wheels 11 and a pair of left and right crawler travelling apparatuses located rearward of the pair of left and right front wheels 11 may be employed.

(9) Although the above embodiment has described the belt-type continuously variable transmission mechanism 31 as an exemplary constituent element of the transmission 28, the constituent element of the transmission 28 is not limited thereto. For example, other continuously variable transmission mechanisms such as a hydrostatic continuously variable transmission mechanism may be provided in place of the belt-type continuously variable transmission mechanism 31.

(10) Although the above embodiment has described the utility vehicle as an exemplary work vehicle, the work vehicle is not limited thereto. For example, other work vehicles such as a tractor and a mowing machine may be employed.

What is claimed is:

1. A work vehicle comprising:
   an engine;
   a transmission capable of converting power of the engine into forward travelling power or reverse travelling power and outputting the converted power;
   a travelling apparatus capable of being driven by the power output from the transmission;
   a travelling body capable of travelling using the travelling apparatus;
   an accelerator operation tool capable of changing a target rotational speed of the engine through an operation;
   a travelling state determination unit capable of determining a travelling state of the travelling body; and
   a control unit that, if it has been determined by the travelling state determination unit that the travelling body is in a reverse travelling state, restricts an upper limit value of the target rotational speed of the engine that is based on an operation on the accelerator operation tool to be a lower value than in a case where it has been determined by the travelling state determination unit that the travelling body is in a forward travelling state;
   wherein, for a same travelling speed in the forward travelling state and the reverse travelling state, a ratio of a reduction ratio when in the reverse travelling state to a smallest reduction ratio when in the forward travelling state is set to be substantially equal to a ratio of the upper limit value of the target rotational speed of the engine when in the reverse travelling state to the upper limit value of the target rotational speed of the engine when in the forward travelling state at the smallest reduction ratio.

2. The work vehicle according to claim 1, further comprising:
   a gear shift operation tool capable of achieving, by being operated to a forward travelling position, a state where the transmission can output the forward travelling power, and achieving, by being operated to a reverse travelling position, a state where the transmission can output the reverse travelling power,
   wherein the travelling state determination unit is configured to determine that the travelling body is in the reverse travelling state, by the gear shift operation tool being in the reverse travelling position.

3. The work vehicle according to claim 1, further comprising:

a map storing unit that stores multiple sets of map data indicating a relationship between an operation amount of the accelerator operation tool and the target rotational speed of the engine, wherein the control unit is configured to control a rotational speed of the engine based on the map data that is selectively read out from the map storing unit, and wherein if it has been determined by the travelling state determination unit that the travelling body is in the reverse travelling state, the control unit is configured to read out the map data in which the upper limit value of the target rotational speed of the engine that is based on the operation on the accelerator operation tool is smaller than in the map data that is read out if it has been determined by the travelling state determination unit that the travelling body is not in the reverse travelling state.

4. The work vehicle according to claim 3, wherein, in the map data that is read out by the control unit if it has been determined by the travelling state determination unit that the work vehicle is in the reverse travelling state, the target rotational speed of the engine is set to be small over an entire operating range of the accelerator operation tool, compared with the map data that is read out by the control unit if it has been determined by the travelling state determination unit that the work vehicle is not in the reverse travelling state.

5. The work vehicle according to claim 3, wherein, in the map data that is read out by the control unit if it has been determined by the travelling state determination unit that the work vehicle is in the reverse travelling state, the target rotational speed of the engine in a range where the target rotational speed of the engine that is based on the operation on the accelerator operation tool does not exceed the upper limit value in an operating range of the accelerator operation tool is set to be the same, and the target rotational speed of the engine in a remaining range in the operating range of the accelerator operation tool is set to be smaller, compared with the map data that is read out by the control unit if it has been determined by the travelling state determination unit that the work vehicle is not in the reverse travelling state.

6. The work vehicle according to claim 1, wherein, for the same travelling speed in the forward travelling state and the reverse travelling state, the ratio of the reduction ratio when in the reverse travelling state to the smallest reduction ratio when in the forward travelling state is set to be substantially equal to a ratio of a highest driving torque of the traveling apparatus when in the reverse travelling state to the highest driving torque of the traveling apparatus when in the forward travelling state at the smallest reduction ratio.

* * * * *